United States Patent
Yang et al.

(10) Patent No.: US 11,570,944 B1
(45) Date of Patent: Feb. 7, 2023

(54) AUTOMATIC ROW-GUIDING METHOD FOR MAIZE COMBINE HARVESTER BASED ON SITUATION OF MISSING PLANTS

(71) Applicant: Hainan University, Haikou (CN)

(72) Inventors: Ranbing Yang, Haikou (CN); Jian Zhang, Haikou (CN); Songmei Yang, Haikou (CN); Xiantao Zha, Haikou (CN); Jiejie Xing, Haikou (CN); Yiren Qing, Haikou (CN); Wenwen Guo, Haikou (CN); Peng Xu, Haikou (CN); Kang Xu, Haikou (CN); Wenbin Sun, Haikou (CN)

(73) Assignee: Hainan University, Haikou (CN)

( * ) Notice: Subject to any disclaimer, the term of this patent is extended or adjusted under 35 U.S.C. 154(b) by 0 days.

(21) Appl. No.: 17/898,246

(22) Filed: Aug. 29, 2022

(30) Foreign Application Priority Data

Aug. 31, 2021 (CN) .......................... 202111014735.6

(51) Int. Cl.
  *A01B 69/04* (2006.01)
  *A01D 45/02* (2006.01)
(52) U.S. Cl.
  CPC .......... *A01B 69/008* (2013.01); *A01D 45/028* (2013.01)
(58) Field of Classification Search
  CPC ........................... A01B 69/008; A01D 45/028
  See application file for complete search history.

(56) References Cited

U.S. PATENT DOCUMENTS

| | | | | |
|---|---|---|---|---|
| 4,947,324 A | * | 8/1990 | Kamimura | G05D 1/027 318/587 |
| 5,264,709 A | * | 11/1993 | Kamimura | G01S 17/931 180/169 |
| 5,509,486 A | * | 4/1996 | Anderson | A01D 41/1278 172/6 |
| 5,837,997 A | * | 11/1998 | Beck | A01M 7/0089 47/1.7 |
| 5,904,210 A | * | 5/1999 | Stump | E21B 47/13 175/45 |

(Continued)

FOREIGN PATENT DOCUMENTS

| CN | 107996132 A | 5/2018 |
|---|---|---|
| CN | 109017779 A | 12/2018 |

(Continued)

OTHER PUBLICATIONS

First Office Action issued in counterpart Chinese Patent Application No. 202111014735.6, dated May 20, 2022.

*Primary Examiner* — Mussa A Shaawat
(74) *Attorney, Agent, or Firm* — Westbridge IP LLC (57) ABSTRACT

Disclosed is an automatic row-guiding method for maize combine harvester based on the situation of missing plants, comprising: S1, guiding calculation of missing plants according to a traveling speed of a harvester and output values of left and right detecting sensors; and S2, performing guiding calculation of missing plants if there is a situation of missing plant, obtaining a first target turning angle of an electric steering wheel; or obtaining a second target turning angle according to the output values of the left and right detecting sensors if there is no situation of missing plant, then adjusting the steering wheel in terms of controlling direction, and finally, realizing automatic row-guiding of the combine harvester.

5 Claims, 6 Drawing Sheets

(56) References Cited

U.S. PATENT DOCUMENTS

| | | | | |
|---|---|---|---|---|
| 5,931,882 A * | 8/1999 | Fick | ............ | A01C 23/007 |
| | | | | 172/4 |
| 5,955,973 A * | 9/1999 | Anderson | ............ | G01C 21/20 |
| | | | | 340/995.25 |
| 5,974,348 A * | 10/1999 | Rocks | ............ | G01S 1/7034 |
| | | | | 701/28 |
| 6,041,582 A * | 3/2000 | Tiede | ............ | A01B 79/005 |
| | | | | 56/10.2 A |
| 6,061,618 A * | 5/2000 | Hale | ............ | A01B 79/005 |
| | | | | 342/357.62 |
| 6,082,466 A * | 7/2000 | Gudat | ............ | A01B 69/008 |
| | | | | 172/6 |
| 6,085,135 A * | 7/2000 | Steckel | ............ | G09B 29/106 |
| | | | | 340/988 |
| 6,336,066 B1 | 1/2002 | Pellenc et al. | | |
| 2007/0005208 A1 * | 1/2007 | Han | ............ | A01B 69/001 |
| | | | | 701/50 |
| 2013/0325242 A1 * | 12/2013 | Cavender-Bares | .. | A01C 21/005 |
| | | | | 701/25 |
| 2021/0000006 A1 * | 1/2021 | Ellaboudy | ............ | G06V 10/60 |
| 2021/0079410 A1 * | 3/2021 | Yang | ............ | C12N 15/09 |

FOREIGN PATENT DOCUMENTS

| | | | |
|---|---|---|---|
| CN | 208754720 U | 4/2019 | |
| CN | 109819757 A | 5/2019 | |
| CN | 111837626 A | 10/2020 | |
| CN | 112068562 A | 12/2020 | |
| CN | 213880949 U | 8/2021 | |
| JP | 2005212785 A | 8/2005 | |

* cited by examiner

AUTOMATIC ROW-GUIDING METHOD FOR MAIZE COMBINE HARVESTER BASED ON SITUATION OF MISSING PLANTS

CROSS-REFERENCE TO RELATED APPLICATIONS

This application claims priority to Chinese Patent Application No. 202111014735.6, filed on Aug. 31, 2021, the contents of which are hereby incorporated by reference.

TECHNICAL FIELD

The application relates to the technical field of automatic maize harvesting, and in particular to an automatic row-guiding method for maize combine harvester based on the presence of missing plants.

BACKGROUND

Maize is the third major food crop in China. As for harvesting, pair-row maize combine harvesters are widely used for their high efficiency. Nonetheless, the pair-row maize combine harvesters require precise alignment of the rows, and most scholars and manufacturers therefore provide contact sensors on the splitter to detect the relative position between the plants and the splitter to determine the relative position between the harvester and the plant rows; however, such a method determines the relative position of the plants through continuous contacting of the maize plants with the detecting sensor, and the method fails when the distance between adjacent maize plants is relative large, especially in the case of multiple missing plants, at this time, the harvester deviates seriously from the harvesting route.

SUMMARY

In view of solving the problems of the prior art described above, the present application provides an automatic row-guiding method of maize combine harvester based on the presence of missing plants, so that the cost could be reduced and the accuracy of row seeding could be improved as well.

To achieve the above objectives, the present application adopts the following technical schemes:

an automatic row-guiding method of a maize combine harvester based on the presence of missing plants, including:

S1, evaluating rows of missing plants of maize according to a traveling speed of a harvester in combination with output values of left and right detecting sensors; and S2, performing guiding calculation of missing plants if there is a situation of rows with missing plants, obtaining a first target turning angle of an electric steering wheel; or obtaining a second target turning angle according to the output values of the left and right detecting sensors if there is a situation of rows with no missing plants, then adjusting the steering wheel in terms of controlling direction, and finally, realizing automatic row-guiding of the combine harvester.

Optionally, evaluating rows of missing plants of maize in S1 includes:

when the left and right detecting sensors display no output value, then there is no signal output, indicating that there is a situation of missing plants; and when the left and right detecting sensors display output values, then there is signal output, indicating that there is a situation of no missing plants.

Optionally, evaluating rows of missing plants of maize in S1 is achieved according to the following process:

obtaining a traveling distance from a previous plant through an integrator according to the traveling speed of the harvester, receiving signals from the left and right detecting sensors and thus obtaining a new traveling distance from the previous plant, initializing the new traveling distance from the previous plant as described through distance correction, and returning to the integrator to continue operation; or judging through a comparing unit against a preset plant interval distance, and deciding that a maize plant is absent at this time when the traveling distance from the previous plant is greater than the preset plant interval distance.

Optionally, the guiding calculation of missing plants includes:

setting the traveling distance from the previous plant $L_v$ as 0 under an initial condition, obtaining $L_v$ after system activation, and the calculation is expressed by the following formula:

$$L_v = L_v + \text{speed} * \Delta t$$

where the speed is the speed of harvester, $\Delta t$ is the interval period of evaluating missing plants, and $L_v$ is the travel distance from the previous plant.

Optionally, the guiding calculation of missing plants in S2 includes:

acquiring real-time harvester heading information by Kalman Filter of gyroscope output information;

optionally, the real-time harvester heading information is obtained as follows:

in a process of obtaining target turning angle under a situation of row with missing plants, the gyroscope obtains a real-time heading attitude firstly in a case of missing plants through Kalman Filter, then a plant rows information is fitted using a least squares method, followed by outputting plants rows information; and finally, the target turning angel of the electric steering wheel is output by a closed-loop guiding method of Proportional Integral Derivative (PID).

Optionally, the electric steering wheel continues to work in the situation of missing plants.

The application discloses the following technical effects:

the present application takes Lovol 4YZ-3H maize combine harvester as subject, and RFD4000 voltage type rotary sensor from NOVOTEC as the left and right detecting sensors; there are missing plants in position information obtained by manual measurement, at this time, the harvester is out of control when it runs at a speed of about 3.4 kilometres per hour (km/h) without the method of the present application; while adopting the method of the present application, $L_p$ is set to be of 2-4 plant distances, the harvester firstly moves forward according to the previous fixed turning angle when there is a row of missing plants, then the harvester moves forward according to the guiding method of missing plants when it is judged that the row of missing plants occurs, thus successfully avoiding the problem of operation failure upon meeting rows of missing plants.

BRIEF DESCRIPTION OF THE DRAWINGS

In order to more clearly explain the embodiments of the present application or the technical solutions in the prior art, the following will briefly introduce the drawings that need to be used in the embodiments. Obviously, the drawings in the following description are only some embodiments of the present application. For those of ordinary skill in the art, other drawings can be obtained according to these drawings without any creative effort.

FIG. 1 shows a structural schematic diagram of an overall scheme of an embodiment of the present application.

DETAILED DESCRIPTION OF THE EMBODIMENTS

Various exemplary embodiments of the present application are described in detail below. This detailed description should not be taken as a limitation of the present application, but should be understood as a more detailed description of some aspects, characteristics and embodiments of the present application.

It should be understood that the terms mentioned in the present application are only used to describe specific embodiments, and are not used to limit the present application. In addition, for the numerical range in the present application, it should be understood that each intermediate value between the upper limit and the lower limit of the range is also specifically disclosed. Every smaller range between any stated value or the intermediate value within the stated range and any other stated value or the intermediate value within the stated range is also included in the present application. The upper and lower limits of these smaller ranges can be independently included or excluded from the range.

Unless otherwise stated, all technical and scientific terms used herein have the same meanings commonly understood by those of ordinary skill in the art to which this application belongs. Although the present application only describes preferred methods and materials, any methods and materials similar or equivalent to those described herein can be used in the practice or testing of the present application. All documents mentioned in this specification are incorporated by reference to disclose and describe the methods and/or materials related to the documents. In case of conflict with any incorporated documents, the contents of this specification shall prevail.

Without departing from the scope or spirit of the present application, it is obvious to those skilled in the art that many modifications and changes can be made to the specific embodiments of the present specification. Other embodiments obtained from the description of the present application will be obvious to the skilled person. The specification and embodiment of this application are only exemplary.

As used in this paper, the terms "including", "comprising", "having" and "containing" are all open terms, meaning including but not limited to.

As shown in FIGS. 1-6, the present application provides an automatic row-guiding method for maize combine harvester based on the presence of missing plants, including:

S1, evaluating rows of missing plants of maize according to a traveling speed of a harvester in combination with output values of left and right detecting sensors; and S2, performing guiding calculation of missing plants if there is a situation of rows with missing plants, obtaining a first target turning angle of an electric steering wheel; or obtaining a second target turning angle according to the output values of the left and right detecting sensors if there is a situation of rows with no missing plants, then adjusting the steering wheel in terms of controlling direction, and finally, realizing automatic row-guiding of the combine harvester.

Optionally, evaluating rows of missing plants of maize in S1 includes:

when the left and right detecting sensors display no output value, then there is no signal output, indicating that there is a situation of missing plants; and when the left and right detecting sensors display output values, then there is signal output, in indicating that there is a situation of no missing plants.

Figure 1:
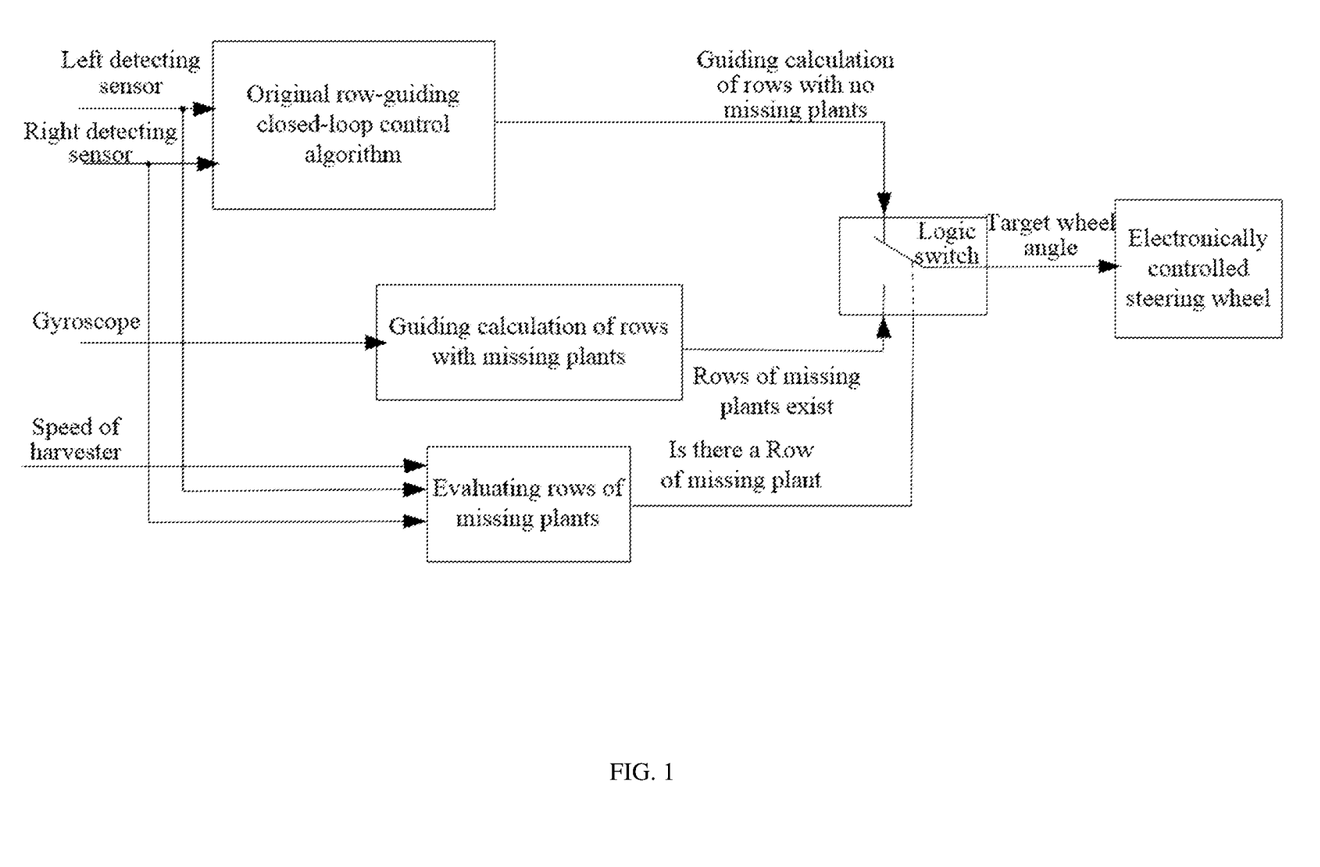
Figure 2:
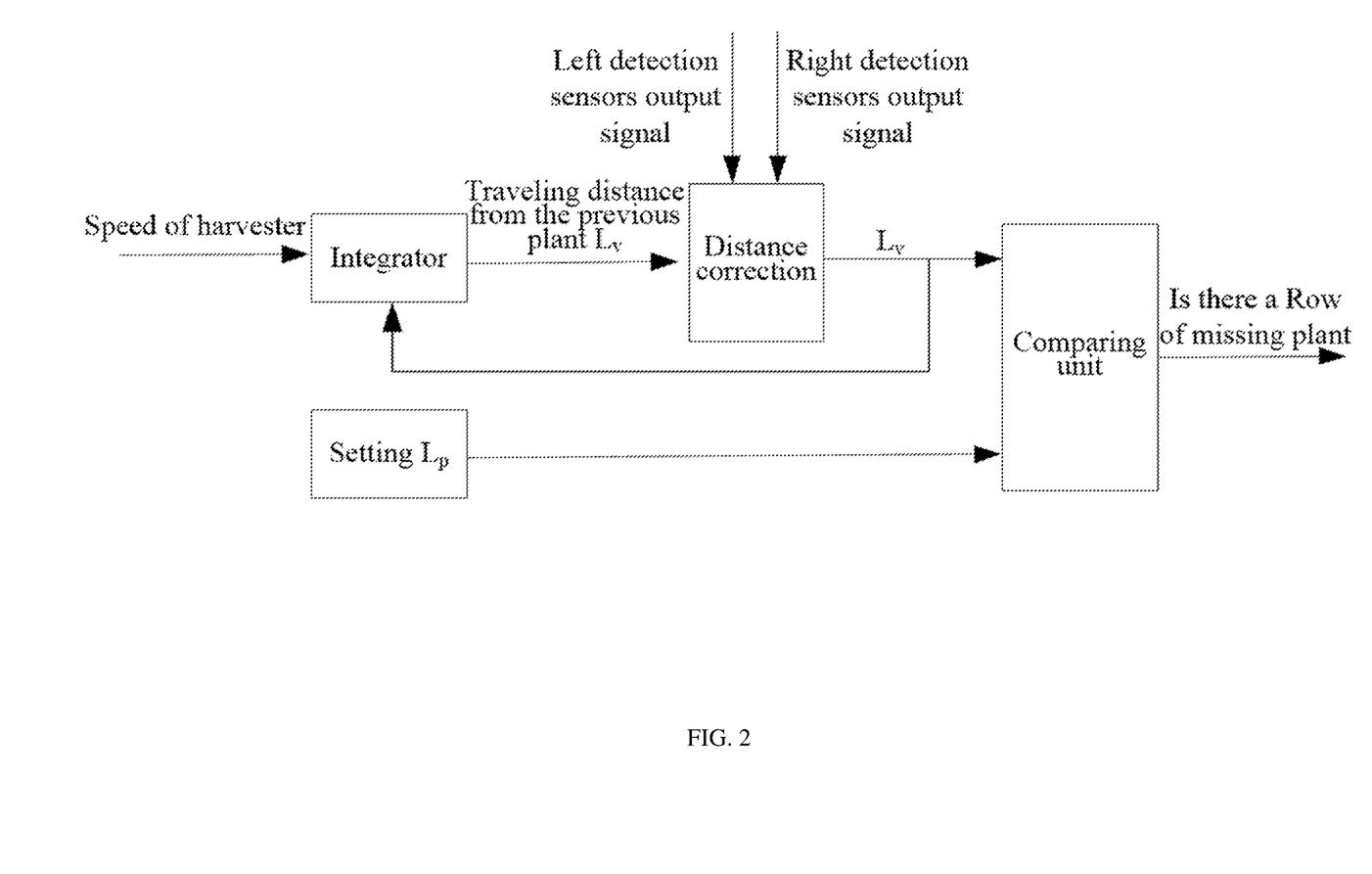
FIG. 2 shows a schematic diagram of logic judgment of missing plants in an embodiment of the present application.

Optionally, evaluating rows of missing plants of maize in S1 is achieved according to the following process:

obtaining a traveling distance from a previous plant through an integrator according to the traveling speed of the harvester, receiving signals from the left and right detecting sensors and thus obtaining a new traveling distance from the previous plant, initializing the new traveling distance from the previous plant as described through distance correction, and returning to the integrator to continue operation; or judging through a comparing unit against a preset plant interval distance, and deciding that a maize plant is absent at this time when the traveling distance from the previous plant is greater than the preset plant interval distance.

Optionally, the guiding calculation of missing plants includes:

setting the traveling distance from the previous plant $L_v$ as 0 under an initial condition, obtaining $L_v$ after system activation, and the calculation is expressed by the following formula:

$$L_v = L_v + \text{speed} * \Delta t$$

where the speed is the speed of harvester, $\Delta t$ is the interval period of evaluating missing plants, and $L_v$ is the travel distance from the previous plant.

Figure 3:
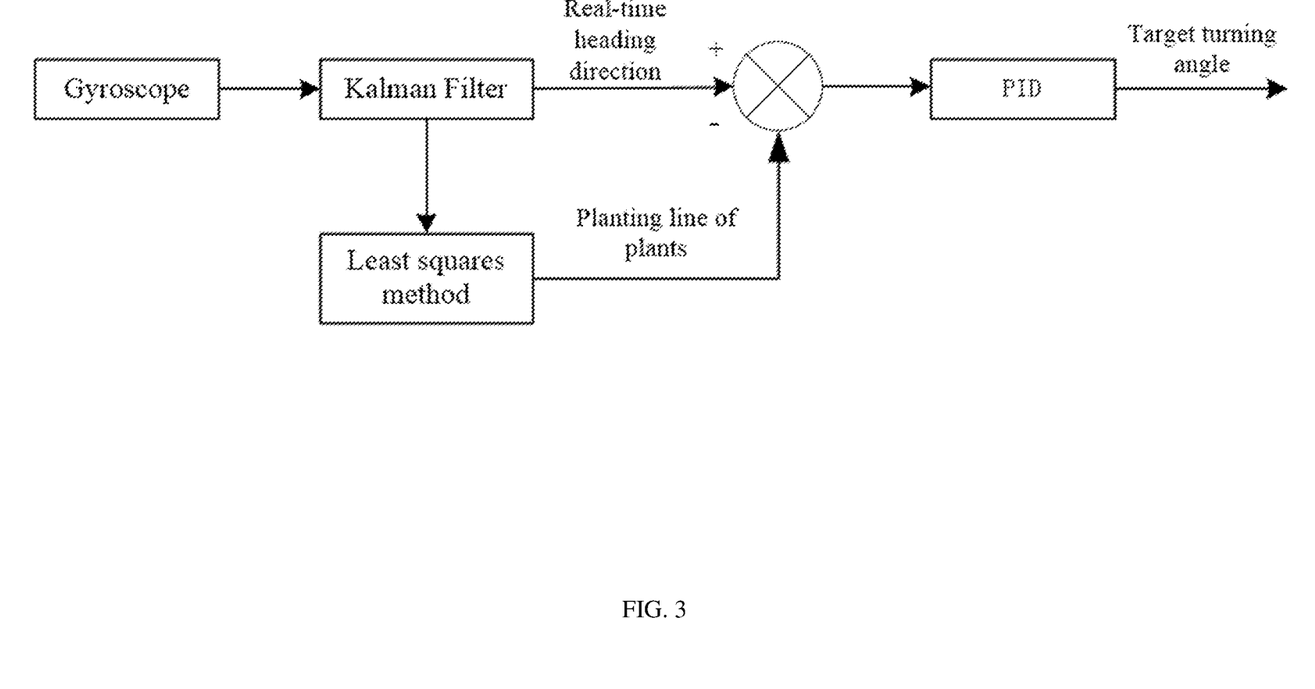
FIG. 3 shows a structural schematic diagram of a method of missing plant-guiding according to an embodiment of the present application.

Optionally, the guiding calculation of missing plants in S2 includes:

acquiring real-time harvester heading information by Kalman Filter of output information from a gyroscope;

optionally, the real-time harvester heading information is obtained as follows:

in a process of obtaining target turning angle under a situation of missing plant, the gyroscope obtains real-time heading attitude firstly in a case of no missing plants through Kalman Filter, then a plant rows information is fitted using a least squares method, followed by output plants row information; and finally, the target turning angel of the electric steering wheel is output by a closed-loop guiding method of Proportional Integral Derivative (PID).

Optionally, the electric steering wheel continues to work in the situation of missing plant.

Missing Plants Evaluation:

no signal is output when no plant is in contact with the sensors, which can be utilized to detect whether there are missing plants within a certain distance $L_p$, where the $L_p$ should be greater than at least one maize planting distance; $L_p$ should also not be too large so as to reduce the offset distance, nor should it be equal to one maize planting distance, so as to avoid misjudging of missing plants due to uneven maize planting or deviation of harvester speed detection and affecting the guiding method; besides, it is proved that $L_p$ of 2-4 plant distances is a recommended value; when the left or right detection sensors output signal, i.e. a new maize plant is detected by the harvester, the $L_v$ is hereby reset to zero by a distance correction module, otherwise the $L_v$ value remains unchanged; the comparing unit compares the $L_v$ with the preset interval $L_p$, and it is considered that there is a missing maize plant when $L_v$ is greater than the preset value $L_p$.

The gyroscope is fixed under the driver's seat near the center of mass of the harvester so as to make sure that the harvester travels along the planting row in the event of a missing plant; the real-time heading information of the harvester is obtained by Kalman Filter of the gyroscope output information, where the gyroscope obtains real-time heading attitude firstly in a case of no missing plants through Kalman Filter, then the plant rows information is fitted using the least squares method, followed by output plants row information; and finally, the target turning angel of the electric steering wheel is output by the closed-loop guiding method of PID.

Figure 4:
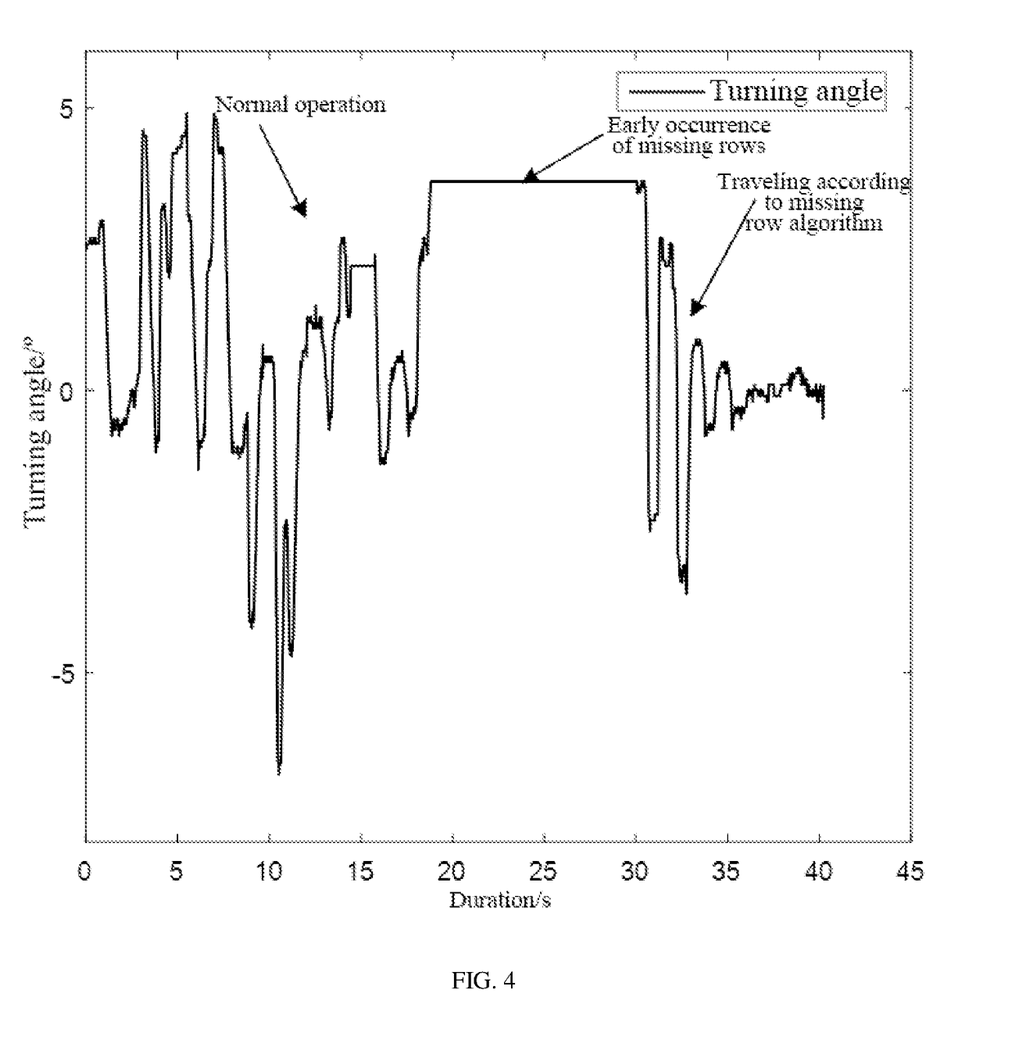
FIG. 4 illustrates a fitting effect of blank row operation according to the embodiment of the present application.
Figure 5:
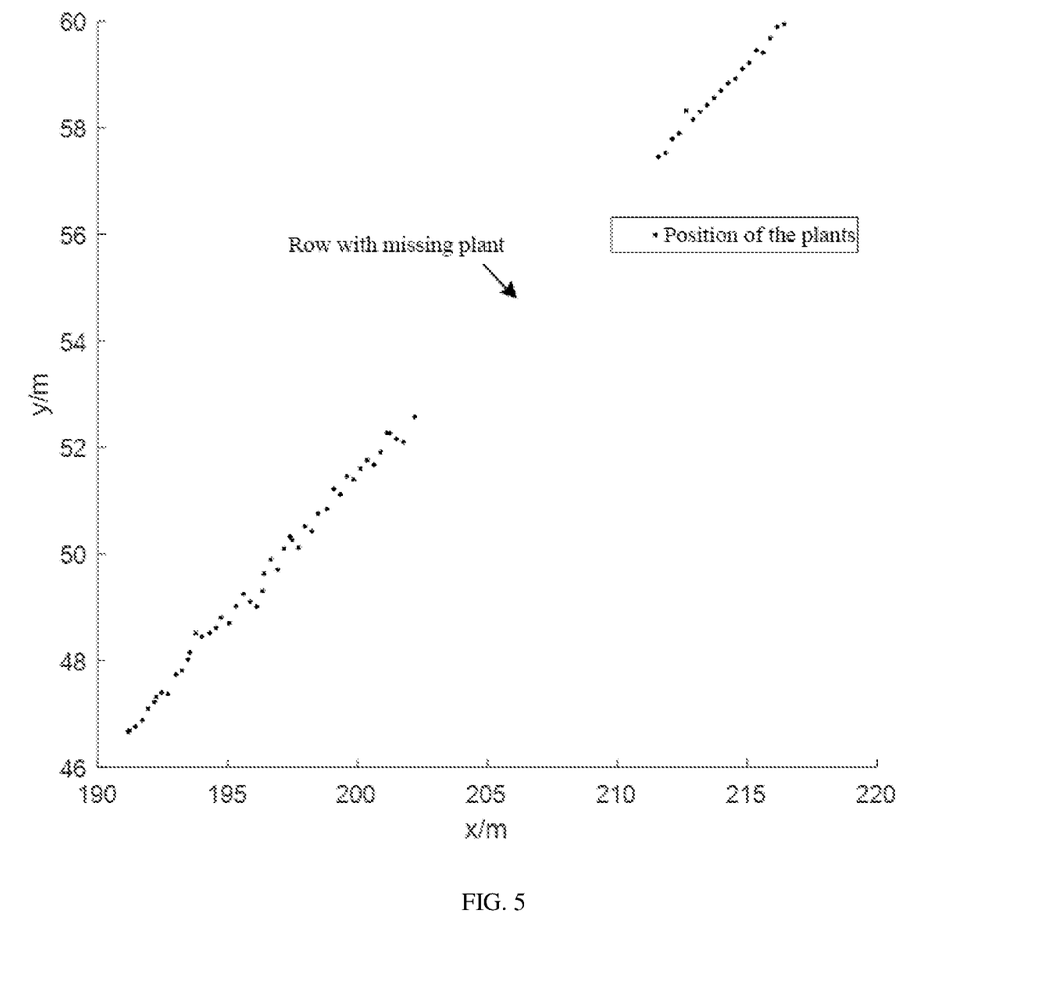
FIG. 5 illustrates a fitting effect of blank row operation according to the embodiment of the present application.
Figure 6:
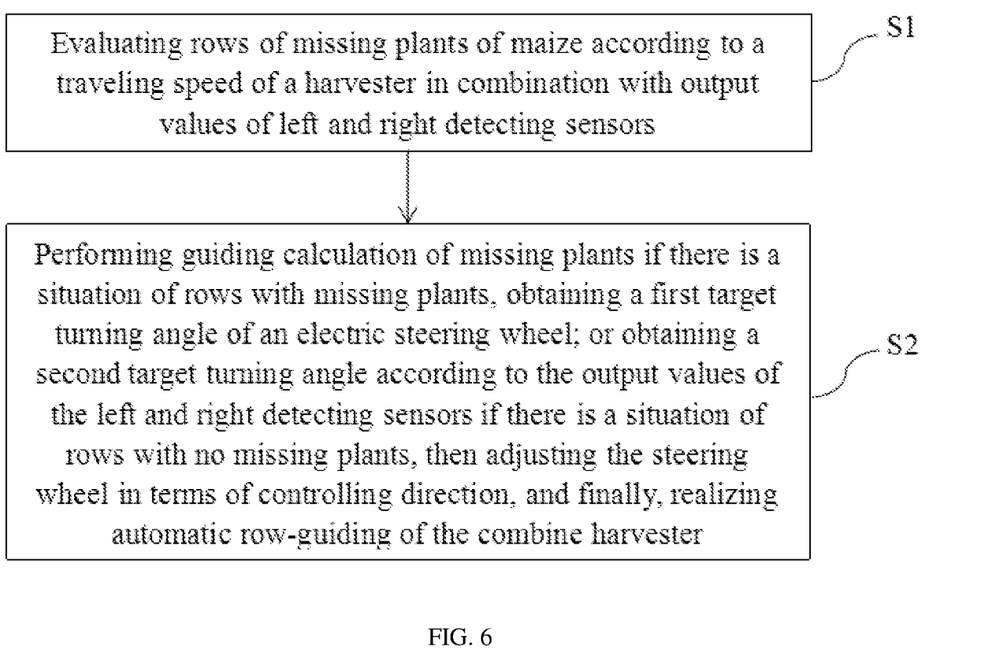
FIG. 6 shows a process illustrating the method of missing plant-guiding according to an embodiment of the present application.

According to the method provided by the present application, Lovol 4YZ-3H maize combine harvester is taken as subject, and RFD4000 voltage type rotary sensor from NOVOTEC is taken as the left and right detecting sensors; in the situation of missing plants in position information obtained by manual measurement, the harvester loses control when it runs at a speed of about 3.4 km/h without adopting the method of the present application; while adopting the method of the present application, $L_p$ is set to be of 2-4 plant distances, the harvester firstly moves forward according to the last fixed turning angle when there is a row of missing plants, then the harvester moves forward according to the guiding method of missing plants when it is judged that the row of missing plants occurs, thus successfully avoiding the problem of operation failure in the situation of missing plants.

The above-mentioned embodiments only describe the preferred mode of the application, but do not limit the scope of the application. On the premise of not departing from the design spirit of the application, all kinds of modifications and improvements made by ordinary technicians in the field to the technical scheme of the application shall fall within the scope of protection determined by the claims of the application.

What is claimed is:

1. An automatic row-guiding method for maize combine harvester based on a presence of missing plants, comprising:
   S1, evaluating rows of missing plants of maize according to a traveling speed of a harvester in combination with output values of left and right detecting sensors; and
   S2, performing guiding calculation of missing plants if there is a situation of rows with missing plants, obtaining a first target turning angle of an electric steering wheel; or obtaining a second target turning angle according to the output values of the left and right detecting sensors if there is a situation of rows with no missing plants, then adjusting the steering wheel in terms of controlling direction, and finally, realizing automatic row-guiding of the combine harvester;
   wherein the guiding calculation of missing plants in S2 comprises:
   acquiring real-time harvester heading information by Kalman Filter of gyroscope output information;
   wherein the real-time harvester heading information is obtained as follows:
   in a process of obtaining target turning angle under a situation of row with missing plants, the gyroscope obtains a real-time heading attitude firstly in a case of missing plants through Kalman Filter, then a plant rows information is fitted using a least squares method, followed by outputting plants rows information; and finally, the target turning angel of the electric steering wheel is output by a closed-loop guiding method of proportional integral derivative (PID).

2. The automatic row-guiding method for maize combine harvester based on the presence of missing plants according to claim 1, wherein guiding calculation of missing plants in S1 comprises:
   when the left and right detecting sensors display no output value, then there is no signal output, indicating that there is a situation of missing plants; and
   when the left and right detecting sensors display the output values, then there is signal output, indicating that there is a situation of no missing plants.

3. The automatic row-guiding method for maize combine harvester based on the presence of missing plants according to claim 2, wherein the guiding calculation of missing plants is achieved according to the following process:
   obtaining a traveling distance from a previous plant through an integrator according to the traveling speed of the harvester, receiving signals from the left and right detecting sensors and thus obtaining a new traveling distance from the previous plant, initializing the new traveling distance from the previous plant as described through distance correction, and returning to the integrator to continue operation; or judging through a comparing unit against a preset plant interval distance, and deciding that a maize plant is absent at this time when the traveling distance from the previous plant is greater than the preset plant interval distance.

4. The automatic row-guiding method for maize combine harvester based on the presence of missing plants according to claim 3, wherein the guiding calculation of missing plants comprises:
   setting the traveling distance from the previous plant $L_v$ as 0 under an initial condition, obtaining $L_v$ after system activation, and the calculation is expressed by the following formula:

$$L_v = L_v + \text{speed} * \Delta t$$

wherein the speed is the speed of harvester, $\Delta t$ is the interval period of evaluating missing plants, and $L_v$ is the travel distance from the previous plant.

5. The automatic row-guiding method for maize combine harvester based on the presence of missing plants according to claim 1, wherein the electric steering wheel continues to work in the presence of the missing plants.

* * * * *